US012801216B2

(12) United States Patent
Osman et al.

(10) Patent No.: US 12,801,216 B2
(45) **Date of Patent: *Nov. 17, 2026**

(54) FILTERING OF GAZE TRACKING INFORMATION TO TRIGGER READING CONTROL MODE

(71) Applicant: SONY INTERACTIVE ENTERTAINMENT INC., Tokyo (JP)

(72) Inventors: Steven Osman, San Francisco, CA (US); Jorge Arroyo Palacios, Livermore, CA (US); Tooba Ahsen, Sunnyvale, CA (US)

(73) Assignee: SONY INTERATIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/225,846

(22) Filed: Jun. 2, 2025

(65) Prior Publication Data

US 2025/0291415 A1 Sep. 18, 2025

Related U.S. Application Data

(63) Continuation of application No. 18/591,424, filed on Feb. 29, 2024, now Pat. No. 12,346,497.

(60) Provisional application No. 63/613,980, filed on Dec. 22, 2023.

(51) Int. Cl.
*G06F 3/01* (2006.01)

(52) U.S. Cl.
CPC .............. *G06F 3/013* (2013.01); *G06F 3/012* (2013.01)

(58) Field of Classification Search
None
See application file for complete search history.

(56) References Cited

U.S. PATENT DOCUMENTS

| | | | | |
|---|---|---|---|---|
| 9,791,927 | B2 * | 10/2017 | Lopez | G06V 40/19 |
| 12,346,497 | B1 | 7/2025 | Osman et al. | |
| 2012/0019662 | A1 * | 1/2012 | Maltz | G06F 3/013 348/158 |
| 2012/0256967 | A1 * | 10/2012 | Baldwin | G06F 3/013 345/684 |
| 2014/0268054 | A1 * | 9/2014 | Olsson | G06F 1/1686 351/209 |

(Continued)

OTHER PUBLICATIONS

Non-Final Office Action issued in U.S. Appl. No. 18/591,424 dated Dec. 12, 2024, 15 pages.

(Continued)

*Primary Examiner* — Krishna P Neupane
(74) *Attorney, Agent, or Firm* — Kilpatrick Townsend & Stockton LLP

(57) ABSTRACT

Techniques that include presenting one or more images on a display device in response to execution of a computer program on a computing device. The techniques further include collecting gaze tracking information corresponding to a location of a user's gaze with respect to the one or more images presented on the display device. The techniques further include analyzing the gaze tracking information to detect a pattern of the user's gaze. The techniques further include upon detecting the pattern of the user's gaze, activating a first mode in which the user's gaze triggers commands affecting execution of the computer program.

20 Claims, 8 Drawing Sheets

(56) References Cited

U.S. PATENT DOCUMENTS

| | | | | |
|---|---|---|---|---|
| 2015/0084864 | A1* | 3/2015 | Geiss | G06F 21/316 345/158 |
| 2015/0193018 | A1* | 7/2015 | Venable | G06F 3/04842 345/158 |
| 2015/0277552 | A1 | 10/2015 | Wilairat et al. | |
| 2018/0275753 | A1* | 9/2018 | Publicover | G06F 3/04812 |
| 2019/0156100 | A1 | 5/2019 | Rougeaux et al. | |
| 2019/0235247 | A1 | 8/2019 | Norden | |
| 2022/0236796 | A1 | 7/2022 | Konrad et al. | |
| 2024/0111361 | A1 | 4/2024 | Tibbling et al. | |

OTHER PUBLICATIONS

Notice of Allowance issued in U.S. Appl. No. 18/591,424 dated Mar. 19, 2025, 13 pages.

Ji et al., "3D Face Pose Estimation and Tracking from a Monocular Camera", Image and Vision Computing, vol. 20, No. 7, Feb. 2002, pp. 499-511.

Murphy-Chutorian et al., "Head Pose Estimation in Computer Vision: A Survey", IEEE Transactions on Pattern Analysis and Machine Intelligence, vol. 31, No. 4, Apr. 2009, pp. 1-20.

International Preliminary Report on Patentability issued in PCT/US2024/046940 dated Jul. 2, 2026, 8 pages.

* cited by examiner

FILTERING OF GAZE TRACKING INFORMATION TO TRIGGER READING CONTROL MODE

CROSS-REFERENCES TO RELATED APPLICATIONS

This application is a continuation of U.S. patent application Ser. No. 18/591,424 filed Feb. 29, 2024 which claims benefit of U.S. Provisional Application No. 63/613,980 filed Dec. 22, 2023, the contents of which are incorporated herein by reference in their entirety for all purposes.

FIELD OF THE DISCLOSURE

Aspects of the present disclosure relate to Gaze Tracking, specifically aspects of the present disclosure relate to filtering of gaze tracking information to trigger commands on a device.

BACKGROUND OF THE DISCLOSURE

Head mounted displays (HMDs) are becoming more and more prevalent in the average person's home and in the workplace. Everyday life could be enhanced by the use of HMDs but certain aspects of using HMDs are still less than ideal for the average user. One such aspect is reading or concentration on fine details of images in the HMD. The three dimensional environments used in HMDs software means that manipulating fine objects like the pages of a book or scrolling on webpages can be difficult. Additionally, when reading text split vision of HMD displays can cause the user's eyes to become unfocused while reading small text.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1A:
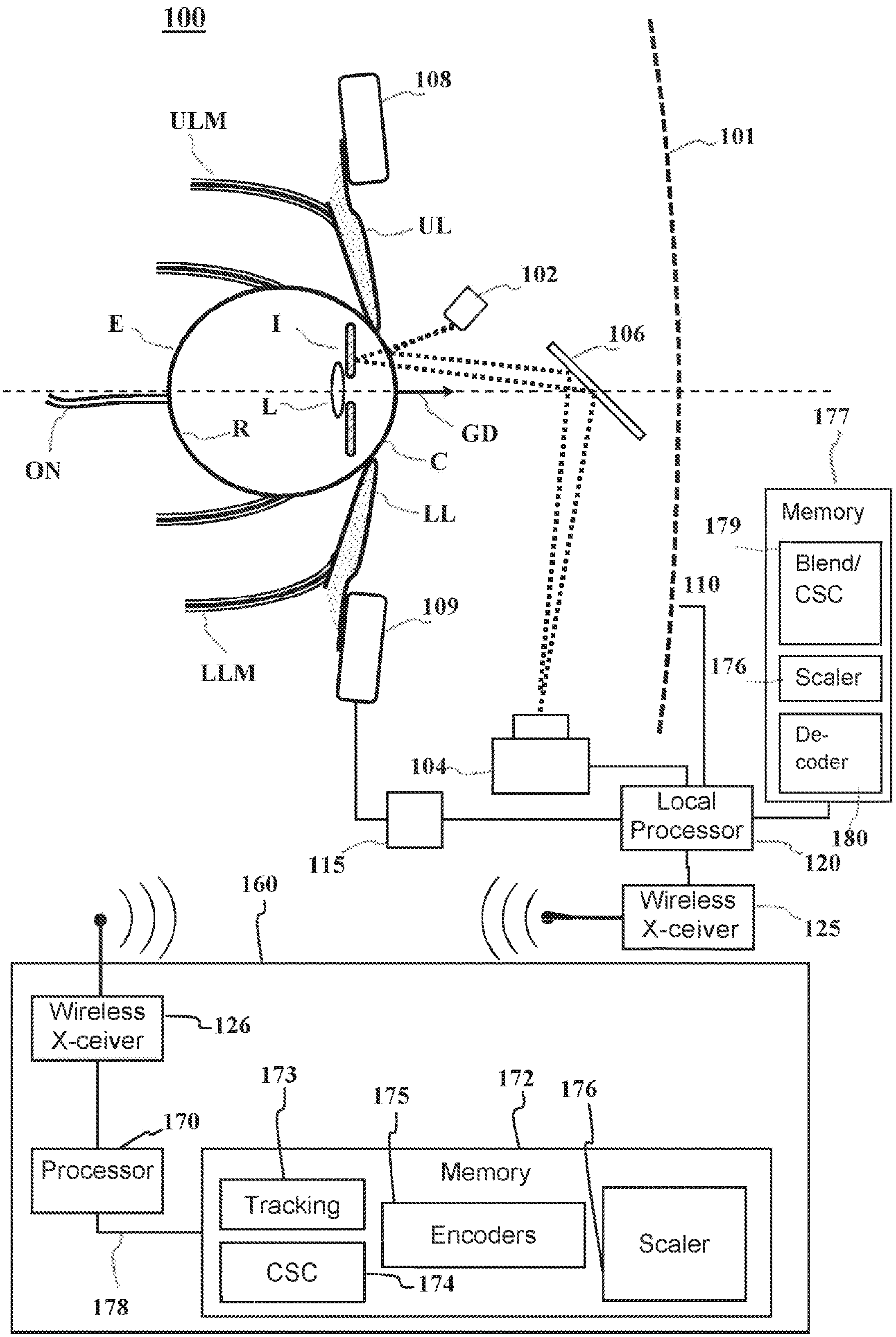
FIGS. 1A-1B are schematic diagrams illustrating gaze tracking within the context of filtering of gaze tracking information to trigger a reading control mode according to aspects of the present disclosure.

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Introduction

Eye gaze tracking has been used in a wide range of applications, including medical research, automobile technology, computer entertainment and video game programs, control input devices, augmented reality glasses, and more. There are a number of techniques for eye tracking, also known as gaze tracking. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a light sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the light sensor, causing the emitted light to be reflected off of the retina and back to the sensor through the pupil. The pupil presents in the image as an identifiable bright spot at the location of the pupil, similar to the red eye effect which occurs in images during conventional flash photography. In this method of gaze tracking, the bright reflection from the pupil itself helps the system locate the pupil if contrast between pupil and iris is not enough.

Dark Pupil tracking involves illumination with a light source that is substantially offline from the optical axis of the light sensor, causing light directed through the pupil to be reflected away from the optical axis of the sensor, resulting in an identifiable dark spot in the Event at the location of the pupil. In alternative Dark Pupil tracking systems, an infrared light source and cameras directed at eyes can look at corneal reflections. Tracking the location of the pupil and corneal reflections provides additional accuracy due to parallax resulting from different depths of reflections.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

FIG. 1A depicts an example of a dark pupil gaze tracking system 100 that may be used in the context of the present disclosure. The gaze tracking system tracks the orientation of a user's eye E relative to a display screen 101 on which visible images are presented. While a display screen is used in the example system of FIG. 1A, certain alternative embodiments may utilize an image projection system capable of projecting images directly into the eyes of a user. In these embodiments, the user's eye E would be tracked relative to the images projected into the user's eyes. In the example of FIG. 1A, the eye E gathers light from the screen 101 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL, LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 102, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a suitable sensor 104 (e.g., an infrared camera) by a wavelength-selective mirror 106. The mirror transmits visible light from the screen 101 but reflects the non-visible light reflected from the eye.

The sensor 104 is preferably an image sensor, e.g., a digital camera that can produce an image of the eye E which may be analyzed to determine a gaze direction GD from the relative position of the pupil. This image may be produced with a local processor 120 or via the transmission of the obtained gaze tracking data to a remote computing device 160. The local processor 120 may be configured according to well-known architectures, such as, e.g., single-core, dual-core, quad-core, multi-core, processor-coprocessor, cell processor, and the like. The image tracking data may be transmitted between the sensor 104 and the remote computing device 160 via a wired connection (not shown), or wirelessly between a wireless transceiver 125 included in the eye tracking device 110 and a second wireless transceiver 126 included in the remote computing device 160. The wireless transceivers may be configured to implement a local area network (LAN) or personal area network (PAN), via a suitable network protocol, e.g., Bluetooth, for a PAN.

The gaze tracking system 100 may also include an upper sensor 108 and lower sensor 109 that are configured to be placed, for example, respectively above and below the eye E. Sensors 108 and 109 may be independent components, or may alternatively be part of a component worn on the user's head that may include, but is not limited to, any combination of the sensor 104, local processor 120, or inertial sensor 115 described below. In the example system shown in FIG. 1A, sensors 108 and 109 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 108 and lower sensor 109. The electrophysiological information collected by sensors 108 and 109 may include, for example, electroencephalography (EEG), electromyography (EMG), or evoked potential information collected as a result of nerve function in the area(s) surrounding the eye E. Sensors 108 and 109 may also be capable of collecting, for example, mechanomyogram or surface electromyogram information as a result of detecting the muscular vibrations or twitches of the muscles surrounding the eye E. The sensors 108 may also be capable of collecting information related to a motion sickness response, including for example, heart rate data, electrocardiography (ECG) Galvanic skin response data. The data collected by sensors 108 and 109 may be delivered with the image tracking data to the local processor 120 and/or the remote computing device 160 as described above.

The gaze tracking system 100 may also be capable of tracking a user's head. Head tracking may be performed by an inertial sensor 115 capable producing signals in response to the position, motion, orientation or change in orientation of the user's head. This data may be sent to the local processor 120 and/or transmitted to the remote computing device 160. The inertial sensor 115 *m* be an independent component, or may alternatively be part of a component worn on the user's head that may include, but is not limited to, any combination of the sensor 104, local processor 120, or sensors 108 and 109 described above. In alternative embodiments, head tracking may be performed via the tracking of light sources on the component. The gaze tracking system 100 may also include one or more memory units 177 (e.g., random access memory (RAM), dynamic random access memory (DRAM), Read only memory (ROM) and the like.

The local processor 120 may be configured to receive encoded data from the network connection. The local processor 120 may be operatively coupled to the one or more memory units 177 and configured to execute one or more programs stored on the memory units 177. The execution of such programs may cause the system to decode video streams from the remote computing device 160 and generate foveated video for display on the display 101. By way of example and not by way of limitation the programs may include a Blender/Conversion Space Configuration program 179, a Scaler program 176 and a decoder program. 180.

The remote computing device 160 may be configured to operate in coordination with the eye tracking device 110 and the display screen 101, in order to perform eye gaze tracking and determine lighting conditions in accordance with aspects of the present disclosure. The computing device 160 may include one or more processor units 170, which may be configured according to well-known architectures, such as, e.g., single-core, dual-core, quad-core, multi-core, processor-coprocessor, cell processor, and the like. The computing device 160 may also include one or more memory units 172 (e.g., random access memory (RAM), dynamic random access memory (DRAM), read-only memory (ROM), and the like).

The processor unit 170 may execute one or more programs, portions of which may be stored in the memory 172, and the processor 170 may be operatively coupled to the memory 172, e.g., by accessing the memory via a data bus 178. The programs may be configured to perform eye gaze tracking and determine lighting conditions for the system 100. By way of example, and not by way of limitation, the programs may include gaze tracking programs 173, the execution of which may cause the system 100 to track a user's gaze, e.g., as discussed above, Conversion space configuration programs (CSC) 174 that convert the video frame stream to a form that can be presented by a display device, Encoder programs 175, and video stream scaler programs 176 the execution of which encodes a stream of low resolution video frames and selected high resolution sections of the video frames to be sent to the display. The encoder programs 175 may use a viewer motion sickness response to adjust that size of the region of interest (ROI) to be presented on the display at high resolution to reduce the chance of motion sickness occurring in the viewer, e.g., by reducing the size of the ROI.

By way of example, and not by way of limitation, the gaze tracking programs 173 may include processor executable instructions which cause the system 100 to determine one or more gaze tracking parameters of the system 100 from eye tracking data gathered with the image sensor 104 and eye movement data gathered from the upper and lower sensors 108 and 109, respectively, while light is emitted from the lighting source 102. The gaze tracking programs 173 may also include instructions which analyze images gathered with the image sensor 104 in order to detect a presence of a change in lighting conditions.

Figure 1B:
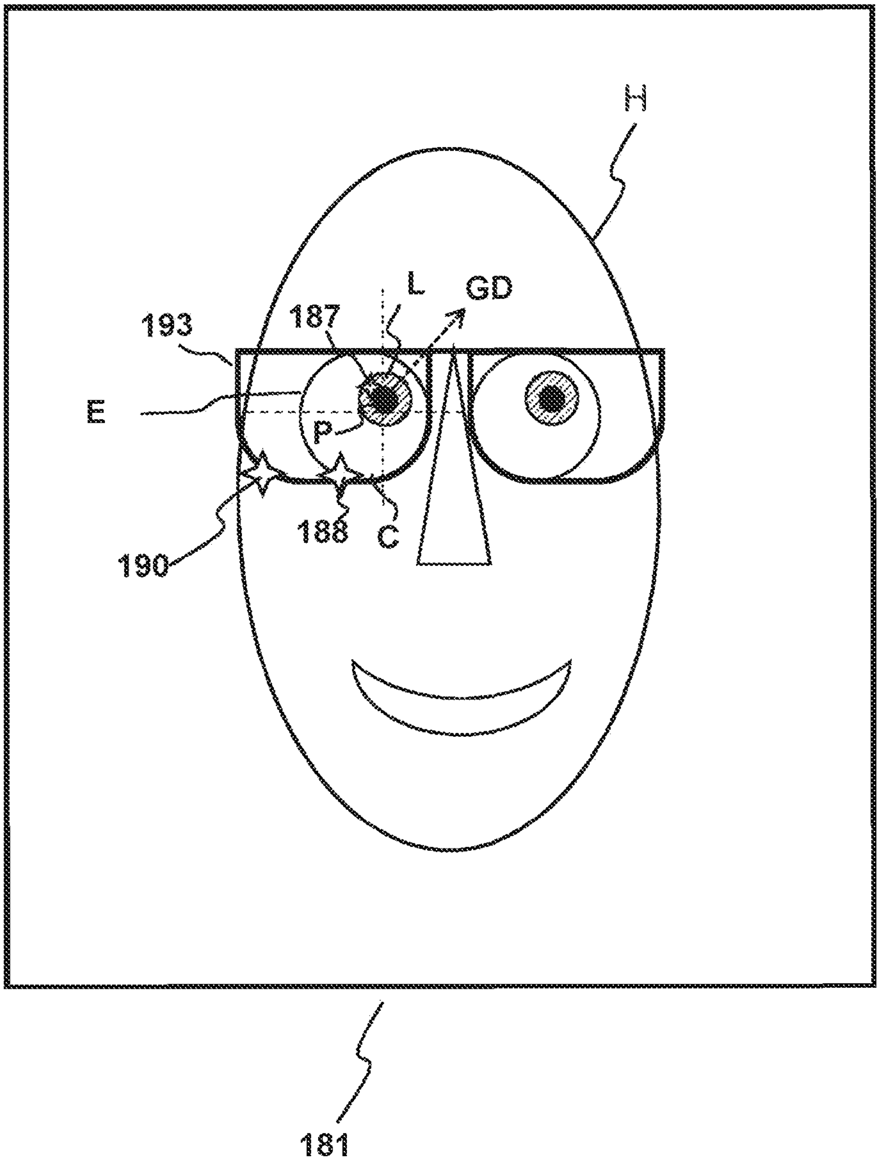

As seen in FIG. 1B, the image 181 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 101, by a straightforward geometric computation of a three-dimensional vector based on the known size and shape of the eyeball. The determined gaze direction GD is capable of showing the rotation and acceleration of the eye E as it moves relative to the screen 101.

As also seen in FIG. 1B, the image may also include reflections 187 and 188 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 190 from a user's eyeglasses 193, if these are worn.

According to aspects of the present disclosure, gaze tracking information including gaze point location and dwell time can be monitored to determine whether a user is reading something in order to trigger a "reading control mode" for a computer application, such as a video game. The filtering takes advantage of characteristic behavior of human eye movement when reading. In particular, when a person reads their eyes tend to dwell for a brief period of time on certain words. By tracking the location of a user's gaze as a function of time the system can determine when the user's gaze movement pattern is characteristic of reading. When reading mode is detected, the gaze tracking program can trigger a reading control mode that initiates a particular command when the user's gaze subsequently dwells on a specific word or object that is associated with a particular command.

Figure 2A:
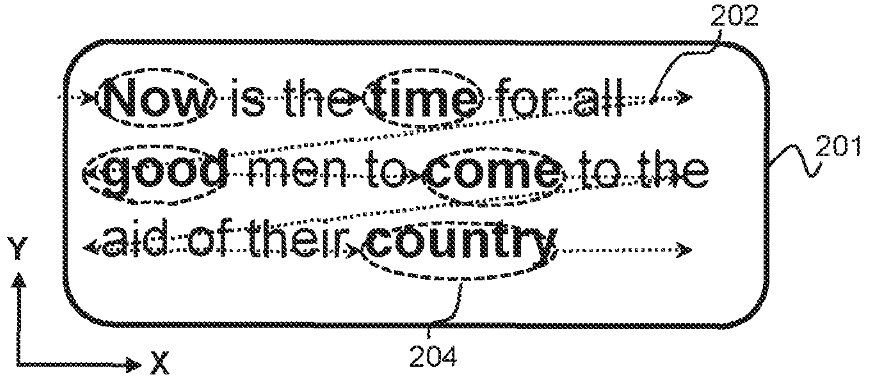
FIG. 2A depicts a gaze tracking reading pattern in accordance with aspects of the present disclosure.
Figure 2B:
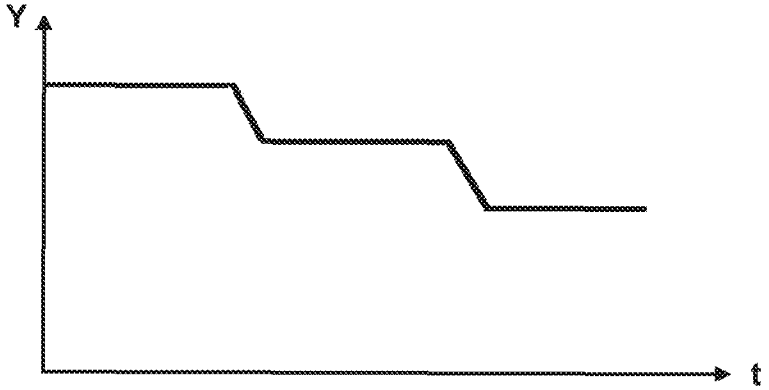
FIG. 2B is a timing diagram depicting a vertical component of the gaze tracking reading pattern of FIG. 2A with respect to time.
Figure 2C:
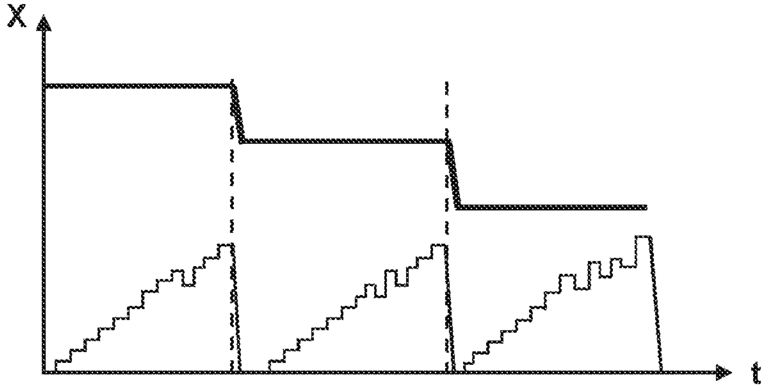
FIG. 2C is a timing diagram depicting a horizontal component of the gaze tracking reading pattern of FIG. 2A with respect to time.

An example of a reading pattern is shown in FIG. 2A. In this example, a user reads text displayed on a screen 201. As the user reads the text, a gaze tracking device tracks the user's gaze in terms vertical coordinate Y and horizontal coordinate X of a screen location corresponding to the user's gaze direction over time t. In this example, the user's gaze traces out a zig-zag pattern 202 characteristic of reading multiple lines of text. The pattern 202 is punctuated by periods of time 204 known as fixations in which the user's gaze dwells on certain words in the text followed by brief periods of quick eye movement in which no reading is accomplished, known referred to under the broad term of saccade. The nature of the pattern is illustrated by the timing diagrams shown in FIG. 2B and FIG. 2C. The pattern shown here is a generalization as around 10-15% of the time the eye may regress indicating the user is re-reading a portion of the text. Additionally, the timing diagrams represent many datasets that have undergone averaging to better show the reading pattern which would show less discretized steps. As shown in FIG. 2B, the vertical component of the user's gaze remains more or less fixed as the user reads a line of text and abruptly shifts as the user starts reading the next line. The result is a more or less staircase-shaped pattern in the vertical component Y with respect to time t. FIG. 2C depicts the horizontal component of the user's gaze pattern 202 with respect to time t. The horizontal component in this example is characterized by stepped inclined ramps (shown here as a smoothed average) corresponding to scanning movement of the user's eyes and relatively level portions corresponding to regressions 204. The inclined ramps represent the stepped eye movement with around 275 milliseconds fixation periods followed by a 25 millisecond saccade of eye movement wherein the eye jumps 7 to 9 character spaces over the text when applied to text. The level area represents a regression period wherein the eye jumps back spaces, rereading portions of the text. The movement pattern may also generally be applied to other documents which require reading like behavior such as maps, mathematical equations, inventory screens, spreadsheets, chemical equations, etc. Other identifiable patterns may be present for some types of documents or even reading levels of the user. For example, doctors examine x-rays in an identifiable pattern, and novice doctors examine x-rays in an identifiably different pattern than expert doctors. Language is also a factor in the reading pattern for instance. Arabic-language cultures read right to left and some Asian-language cultures like traditional Japanese scan top to bottom then right to left. Additionally, besides a simple scan or sweep of the content, other identification techniques may be applied for example and without limitation analyzing gaze transition entropy to infer that someone is actively paying attention to something. Gaze transition entropy refers to the likelihood of looking at one point of interest after having looked at another. For example and without limitation, someone glancing at a map without focusing on it may come across the points of interest in a haphazard fashion, however, when engaged with the content, their eyes would fixate more regularly and have a more reasonable or predictable behaviors.

Figure 3:
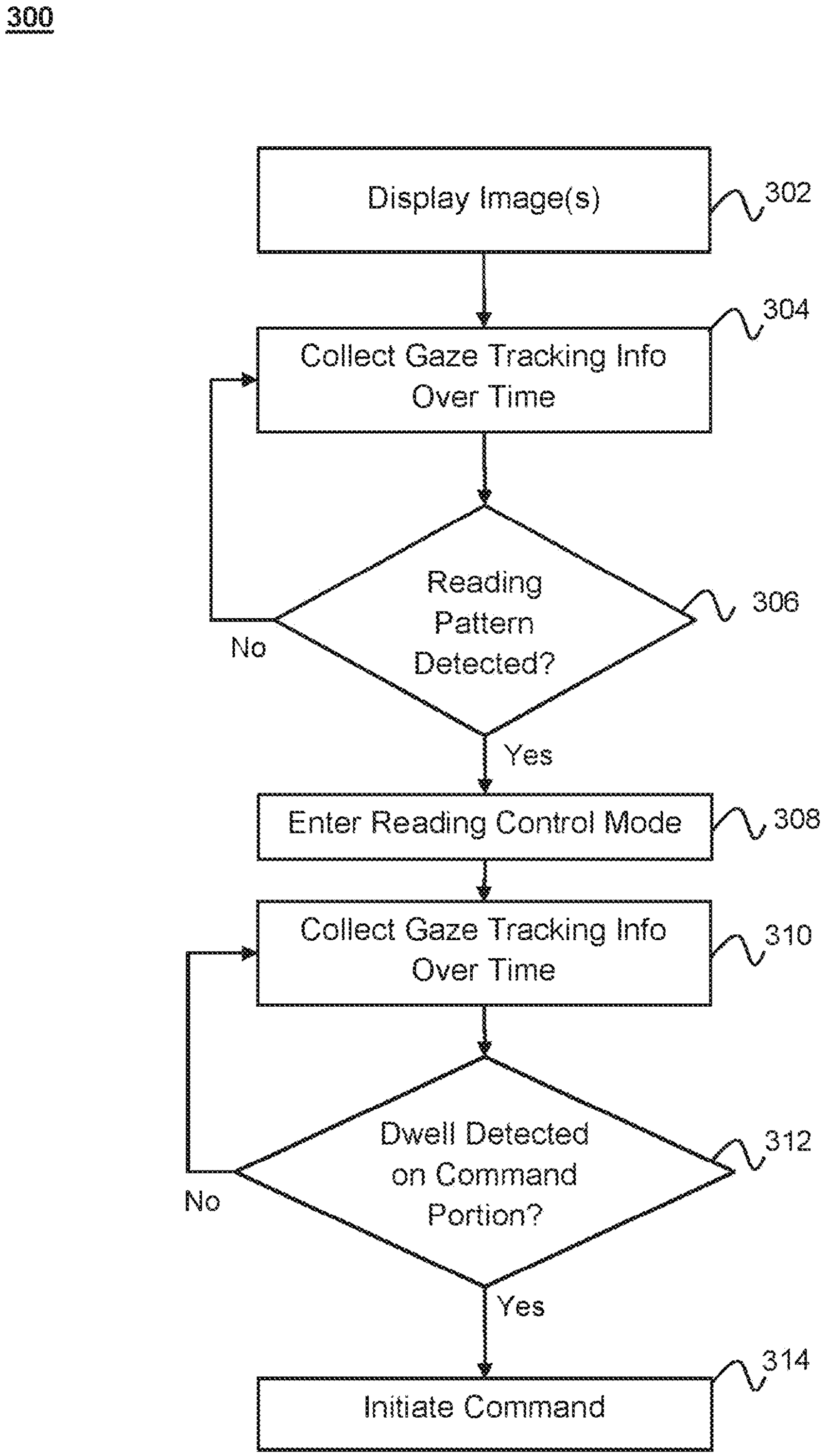
FIG. 3 is a flow diagram illustrating an example of a method for filtering of gaze tracking information to trigger a reading control mode.

According to aspects of the present disclosure, a computer system may be configured to analyze some combination of the vertical and horizontal gaze coordinates with respect to time and recognize patterns consistent with reading. FIG. 3 depicts a flow diagram of a potential method 300 for controlling a computer program according to such aspects of the present disclosure. As indicated at 302, the method may begin by presenting one or more images on a display device in response to execution of the computer program on a computing device. The images may contain text, symbols, objects or some combination thereof. Next, as indicated at 304, gaze tracking information is collected over time. The gaze tracking information corresponds to a location of a user's gaze with respect to the one or more images presented on the display device. By way of example, the gaze tracking information may indicate vertical and horizontal coordinates, or ranges of such coordinates, corresponding to a portion of an image presented on the display device. The gaze tracking information is analyzed over time to detect a pattern of the user's gaze characteristic of reading, as indicated at 306. The analysis may track the gaze direction and dwell time of the user's eyes. During a reading session the eyes may on average fixate for each word approximately 275 millisecond (ms) with variance depending on the word and reading ability of the user and may range from 50-500 ms. An approximate 25 ms saccade follows the 275 ms fixation. During the saccade the eye moves approximately 7 to 9 character spaces across the text without focusing. The eye then fixates on the new location and the pattern repeats. The average sentence length for the $6^{th}$ grade reading level is 12 to 16 words. As such, when a horizontal eye movement is detected matching the pattern shown in FIG. 2C for at least 3.6 seconds ((275 ms+25 ms)×12) the device may interpret this to mean that the user is reading a sentence. In some implementations the period for determining if a user is reading is selectable as the user may want to only enter a reading mode when they are looking at longer text or they may like to enter the mode quickly. Additionally, this pattern may vary slightly for other types of documents such as maps, spreadsheets, inventory screens etc. The vertical movement of the eye is dependent on the formatting of the document and may be used in conjunction with the horizontal movement if the formatting document being viewed is known to the system. With vertical movement the system may detect patterns of relatively static vertical values as there is a left to right sweep followed by a drop in Y value (or increase) coincident with a large right-to-left sweep to as a factor in the determination to enter reading mode. For example and without limitation, if the user is viewing a map within the application the application may provide to the system that the user is viewing a map and in some implementation may provide the screen location of points of interest on the map to the system to improve the identification of patterns indicating reading. In some implementations the pattern indicating reading mode may be simplified by informing the user to look at a particular portion of the screen for a period. When the user performs this action the reading pattern is detected, and the system enters the reading control mode.

Upon detecting the pattern of the user's gaze characteristics of reading, a reading control mode is activated, as indicated at 308. In the reading control mode the location and duration of the user's gaze triggers commands affecting execution of the computer program. By way of example, and not by way of limitation, during the reading control mode, gaze tracking information may be collected as images are presented on the display, as indicated at 310. When the gaze tracking information indicates the user's gaze is dwelling on a portion of an image corresponding to a command at 312 for an extended period (for example and without limitation greater than 275 ms), the command is initiated, as indicated at 314. Alternatively the behavior of the user's eyes may initiate a command, for example and without limitation if the user's eyes are dwelling on a portion of an image such as text for an extended period that may be interpreted as being hard to see and this may be interpreted as dwelling on a command to magnify that portion of the image 312 and the command to magnify is initiated as indicated at 314. Alternatively dwelling on a portion of text for an extended period may be interpreted as dwelling on a command for the system to read that portion of the text aloud with text to speech, and the command for text to speech of that portion of text is initiated. Similarly dwelling on a portion of text may initiate other commands such as translation (if the text is in a language other than the user's default language setting), bookmark that portion of text, dictionary reference the portion of text, encyclopedia search that portion of text, web search etc. In yet another example implementation, an edge of an image (e.g., a text document) may be used as a control portion and when the user's eyes dwell on an edge of the screen the document scroll command is initiated. In one example implementation of scrolling the system detects whether the users eyes are dwelling at the last quarter or third of the screen, and as long as the user's gaze is within that region, scrolling will be initiated. As the user's gaze gets closer to the bottom of the screen, scrolling speed may speed up to keep up with the speed the user is reading and if the user's gaze falls behind their eyes will settle on the center of the screen at which point scrolling stops. In some examples of this implementation, without limitation, the image may be a document written in English and the control portion may be located on the bottom right portion of the screen at last few words of the sentence, when the device detects that the user's gaze has dwelled on the last few words of the text for a defined period, for example and without limitation 500 ms, the command to scroll the page may be initiated allowing the device to scroll at the pace user reads the text. Other commands that may be initiated when the user's gaze dwells on a command portion may include for example and a without limitation one or more of turning a page, exiting, pausing, initiating a visual effect, audio effect, haptic effect, olfactory effect. If the user is reading a map, the system may detect route lines the user is looking at and show navigation times that are updated as they gaze along various parts of the map, so they can see it as a distance from where they are right now. In some other implementations with a may the system could also overlay a preview of traffic congestion of the specific route the user is looking at.

In some implementations after a pattern of eye movement inconsistent with a reading pattern is detected the device may exit the reading mode. In some implementations there may be a threshold period for the user to make eye movements inconsistent with a reading pattern before the device exits reading mode to accommodate the use of commands and distracted reading by the user. For example and without limitation the device may have a threshold period of 1 second and as such the user's eyes may make movements inconsistent with reading for 1 second before the device exits the reading mode. In yet other alternative implementations, a portion of the screen may be reserved for exiting the reading mode, the user may be instructed to look at that portion of the screen to exit reading mode. When the user views said portion of the screen the device exits the reading mode.

Figure 4:
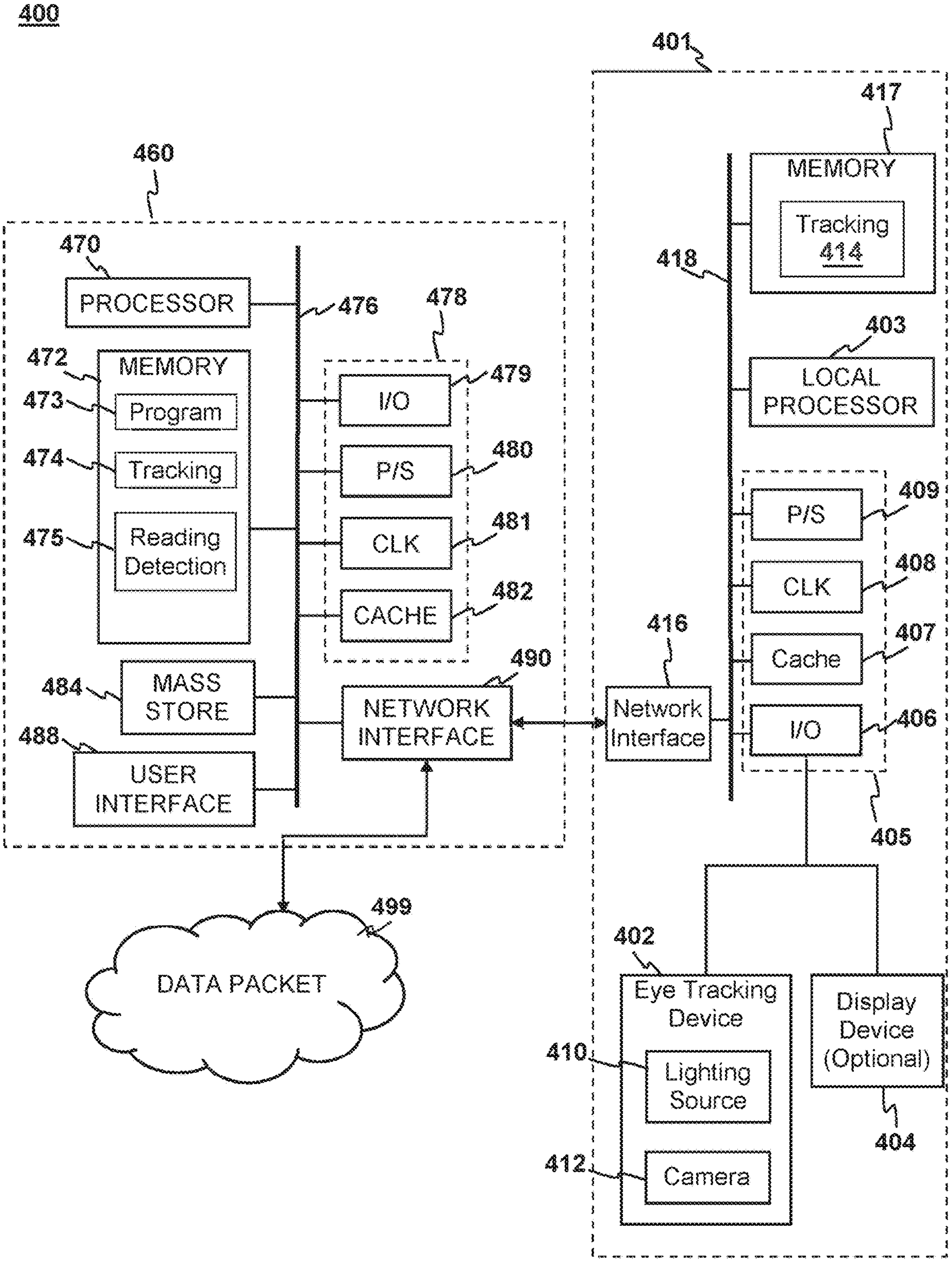
FIG. 4 is a block diagram depicting a system for filtering of gaze tracking information to trigger a reading control mode according to aspects of the present disclosure.

FIG. 4 depicts an example system 400 to further illustrate various aspects of the present disclosure. The system 400 may include a computing device 460 which is coupled to an eye tracking system 401. The eye tracking system 401 may include, e.g., a local processor 403, local memory 417, well known support circuits 405, a network interface 416, operatively coupled by a local bus 418. The eye tracking display system 401 may further include an eye tracking device 402 and (optionally) a display device 404 in order to perform eye gaze tracking and/or calibration for eye tracking in accordance with aspects of the present disclosure. The eye tracking device 402 may be configured as discussed above with respect to FIGS. 1A-1B. The optional display device 404 may be in the form of a cathode ray tube (CRT), flat panel screen, touch screen, or other device that displays text, numerals, graphical symbols, or other visual objects. The local processor 403 may be configured according to well-known architectures, such as, e.g., single-core, dual-core, quad-core, multi-core, processor-coprocessor, cell processor, microcontroller, and the like. The local memory 417 may include, e.g., random access memory (RAM), dynamic random access memory (DRAM), flash memory, solid state digital storage (SDSS), read-only memory (ROM), and the like).

The local processor unit 403 may execute one or more programs, portions of which may be stored in the local memory 417, and the processor 403 may be operatively coupled to the memory 417 e.g., by accessing the memory via a data bus 418. The programs may be include a tracking program 414 configured control the eye tracking device 402 and collect primary gaze tracking information related to a user's gaze direction. The tracking program 414 may alternately may be implemented in hardware by a discrete logical units (not shown) communicatively coupled to the local processor by e.g. the local bus 418.

According to aspects of the present disclosure, eye tracking device 402 may be an embedded system, mobile phone, personal computer, tablet computer, portable game device, workstation, game console, head mounted display device, eye tracking glasses and the like. Moreover the computing device 460 may also be an embedded system, mobile phone, personal computer, tablet computer, portable game device, workstation, game console, and the like.

The eye tracking device 401 may be coupled to the computing device 460, and may include a dynamic lighting source 410 similar to light sources 102 of FIGS. 1A-1B. By way of example, and not by way of limitation, the lighting source 410 may be an invisible lighting source in the form of one or more infrared LEDs, which may be configured to illuminate a user's eyes in order to gather eye tracking data with the sensor 412. The sensor 412 of the eye tracking device may be a detector that is sensitive to light emitted from the light source 410. For example, the sensor 412 may be a camera sensitive to the light source such as an infrared camera, which may be positioned relative to the eye tracking device and the lighting source so that it may capture images of an area illuminated by the lighting source 410.

The computing device 460 may be configured to operate in coordination with the eye tracking system 401, in order to perform eye gaze tracking and determine lighting conditions in accordance with aspects of the present disclosure. The computing device 460 may include one or more processor units 470, which may be configured according to well-known architectures, such as, e.g., single-core, dual-core, quad-core, multi-core, processor-coprocessor, cell processor, and the like. The computing device 460 may also include one or more memory units 472 (e.g., random access memory (RAM), dynamic random access memory (DRAM), read-only memory (ROM), and the like).

The processor unit 470 may execute one or more programs, portions of which may be stored in the memory 472, and the processor 470 may be operatively coupled to the memory 472, e.g., by accessing the memory via a data bus 476. The programs may be configured to perform eye gaze tracking and determine lighting conditions for the system 400. By way of example, and not by way of limitation, the programs may include a gaze tracking program 474, execution of which may cause the system 400 to track a user's gaze and a read detection program 475 that can analyze gaze tracking information to determine when a user's gaze patter corresponds to reading. By way of example, and not by way of limitation, the gaze tracking program 474 may include processor executable instructions which cause the system 400 to collect gaze tracking information over time corresponding to a location of a user's gaze with respect to the one or more images presented on the display device 404 and the read detection program 475 may analyze the gaze tracking information over time to detect a pattern of the user's gaze characteristic of reading, e.g., as discussed above with respect to FIGS. 2A-2C. The combination of the gaze tracking program 474 and reading detection program 475 may operate as discussed above with respect to FIG. 3. Upon detecting the pattern, the gaze tracking programs may activate a reading control mode in which location and duration of the user's gaze triggers commands affecting execution of a computer program 473.

The computing device 460 and the eye tracking system 401 may also include well-known support circuits 478, 405, such as input/output (I/O) circuits 479, 406, power supplies (P/S) 480 409, a clock (CLK) 481, 408, and cache 482, 407, which may communicate with other components of the system, e.g., via the bus 476, 418, respectively. The computing device 460 may include a network interface 490 to facilitate communication with similarly configured network interface 416 on the eye tracking display device 401. The processor units 470, 403 and network interfaces 490, 416 may be configured to implement a local area network (LAN) or personal area network (PAN), via a suitable network protocol, e.g., Bluetooth, for a PAN. The computing device 460 may optionally include a mass storage device 484 such as a disk drive, CD-ROM drive, tape drive, flash memory, or the like, and the mass storage device 484 may store programs and/or data. The computing device 460 may also include a user interface 488 to facilitate interaction between the system 400 and a user. The user interface 488 may include a keyboard, mouse, light pen, game controller, touch interface, or other device.

The system 400 may also include a controller (not pictured) which interfaces with the eye tracking device 401 in order to interact with programs executed by the processor unit 470. The system 400 may also execute one or more general computer applications 473, such as a video game or video stream, which may incorporate aspects of eye gaze tracking as sensed by the tracking device 402 and processed by the tracking program 474 that convert the video frame data to a form that can be presented by a display device, and video stream encoder 475.

The computing device 460 may include a network interface 490, configured to enable the use of Wi-Fi, an Ethernet port, or other communication methods. The network interface 490 may incorporate suitable hardware, software, firmware or some combination thereof to facilitate communication via a telecommunications network. The network interface 490 may be configured to implement wired or wireless communication over local area networks and wide area networks such as the Internet. The network interface 490 may also include the aforementioned wireless transceiver that facilitates wireless communication with the eye tracking device 402 and display device 404. The computing device 460 may send and receive data and/or requests for files via one or more data packets 499 over a network.

It is noted that much of the foregoing description relates to implementations such as HMD where the user's eyes are relatively fixed in location with respect to the screen that is viewed. However, aspects of the present disclosure are not limited to such implementations alone. According to certain aspects of the present disclosure, the eye tracking system 302 may be augmented, e.g., with a digital camera, to incorporate information relating to a user's head position and orientation.

Figure 5A:
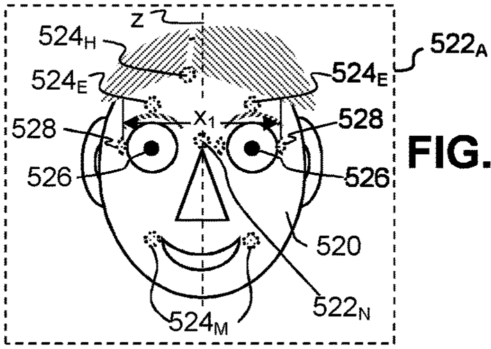
FIGS. 5A-5H are schematic diagrams illustrating examples of the use of eye gaze and face tracking in conjunction with embodiments of the present invention.
Figure 5C:
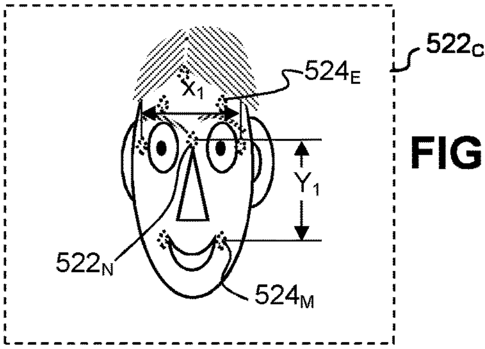
Figure 5B:
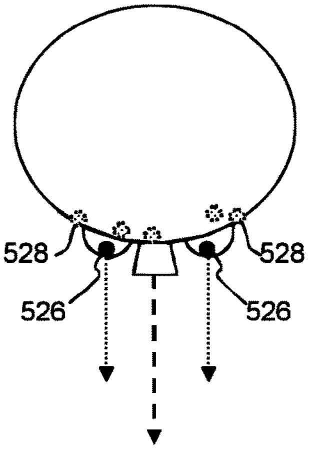
Figure 5D:
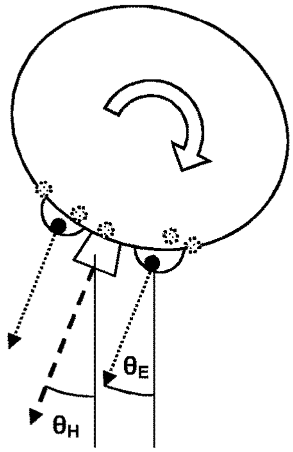

FIGS. 5A-5H illustrate examples of the use of facial orientation and eye gaze direction in conjunction with aspects of the present disclosure. As seen in FIG. 5A a face 520 of a user may appear in an image $\mathbf{522}_A$ obtained with a camera trained on the user. Such cameras are common features of devices such as laptop computers, smart phones, and tablet computers. Image analysis software may identify reference points on the face 520. The software may characterize certain of these reference points, e.g., located at the corners of the mouth 524$_M$, the bridge of the nose 524$_N$, the part in the hair 524$_H$, and at the tops of the eyebrows 524$_E$, as being substantially fixed relative to the face 520. The software may also identify the pupils 526 and corners 528 of the user's eyes as reference points and determine the location of the pupils relative to the corners of the eyes. In some implementations, the centers of the user's eyes can be estimated from the locations of the pupils 526 and corners 528 of eyes. Then, the centers of eyes can be estimated and the locations of pupils can be compared with the estimated locations of the centers. In some implementations, face symmetry properties can be used.

The software can determine the user's facial characteristics, e.g., head tilt angle and eye gaze angle from analysis of the relative locations of the reference points and pupils 526. For example, the software may initialize the reference points 524$_E$, 524$_H$, 524$_M$, 524$_N$, 528 by having the user look straight at the camera and register the locations of the reference points and pupils 526 as initial values. The software can then initialize the head tilt and eye gaze angles to zero for these initial values. Subsequently, whenever the user looks straight ahead at the camera, as in FIG. 9A and the corresponding top view shown in FIG. 5B, the reference points 524$_E$, 524$_H$, 524$_M$, 524$_N$, 528 and pupils 526 should be at or near their initial values.

By way of example and not by way of limitation, the pose of a user's head may be estimated using five reference points, the outside corners 528 of each of the eyes, the outside corners 524$_M$ of the mouth, and the tip of the nose (not shown). A facial symmetry axis may be found by connecting a line between a midpoint of the eyes (e.g., halfway between the eyes' outside corners 528) and a midpoint of the mouth (e.g., halfway between the mouth's outside corners 524$_M$). A facial direction can be determined under weak-perspective geometry from a 3D angle of the nose. Alternatively, the same five points can be used to determine the head pose from the normal to the plane, which can be found from planar skew-symmetry and a coarse estimate of the nose position. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis *Pattern Recognition*, Vol. 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition,* 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 Feb. 2002, pp 499-511, the entire contents of which are incorporated herein by reference.

When the user tilts his head, the relative distances between the reference points in the image may change depending upon the tilt angle. For example, if the user pivots his head to the right or left, about a vertical axis Z the horizontal distance xi between the corners 528 of the eyes may decrease, as shown in the image 522$_C$ depicted in FIG. 5C. Other reference points may also work, or be easier to detect, depending on the particular head pose estimation algorithm being used. The amount change in the distance can be correlated to an angle of pivot $\theta_H$. It is noted that if the pivot is purely about the Z axis the vertical distance $Y_1$ between, say, the reference point at the bridge of the nose 524$_N$ and the reference points at the corners of the mouth 524$_M$, would not be expected to change significantly. However, it would be reasonably expected for this distance $y_1$ to change if the user were to tilt his head upwards or downwards. It is further noted that the software may take the head pivot angle $\theta_H$ into account when determining the locations of the pupils 526 relative to the corners 528 of the eyes for gaze direction estimation. Alternatively, the software may take the locations of the pupils 526 relative to the corners 528 of the eyes into account when determining head pivot angle $\theta_H$. Such an implementation might be advantageous if gaze prediction is easier, e.g., with an infrared light source on a hand-held device, the pupils could be located relatively easily. In the example, shown in FIG. 5C and FIG. 5D, the user's eye gaze angle $\theta_E$ is more or less aligned with the user's head tilt angle. However, because of the pivoting of the user's head and the three-dimensional nature of the shape of the eyeballs, the positions of the pupils 526 will appear slightly shifted in the image 522$_D$ compared to their positions in the initial image 522$_A$.

Figure 5E:
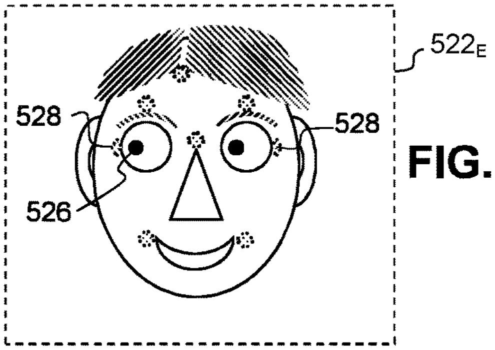
Figure 5G:
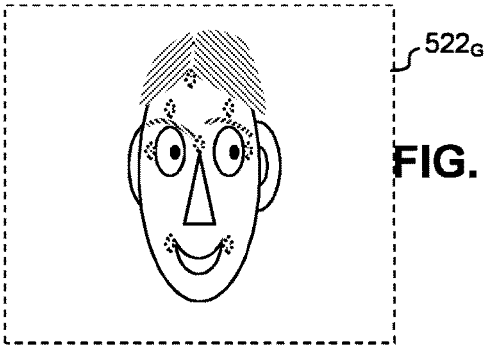
Figure 5F:
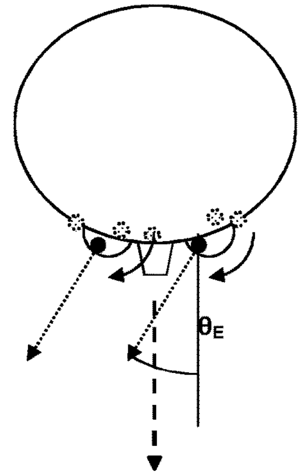

In some situations, the user may be facing the camera, but the user's eye gaze is directed elsewhere, e.g., as shown in FIG. 5E and the corresponding top view in FIG. 5F. In this example, the user's head is tilt angle θn is zero but the eye gaze angle $\theta_E$ is not. Instead, the user's eyeballs are rotated counterclockwise, as seen in FIG. 5F. Consequently, the reference points 524$_E$, 524$_H$, 524$_M$, 524$_N$, 528 are arranged as in FIG. 5A, but the pupils 526 are shifted to the left in the image 522E.

Figure 5H:
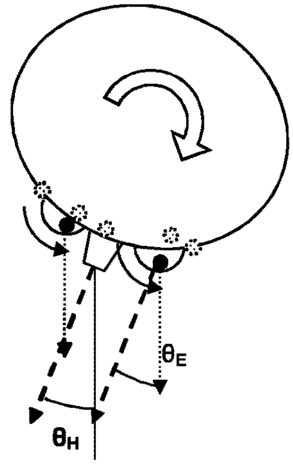

It is noted that the user's head may pivot in one direction and the user's eyeballs may pivot in another direction. For example, as illustrated in FIG. 5H and FIG. 5H, the user 101 may pivot his head clockwise and rotate his eyeballs counterclockwise. Consequently, the reference points 524$_E$, 524$_H$, 524$_M$, 524$_N$, 528 are shifted as in FIG. 5D, but the pupils 526 are shifted to the right in the image 522G shown in FIG. 9G. The gaze tracking system 100, as described in FIG. 1A-1B or the gaze tracking system 302 of FIG. 3, may take this configuration or any of the configurations described above into account in determining the gaze direction GD of the user's eye E.

As may be seen from the foregoing discussion it is possible to track certain user facial orientation characteristics using just a camera. However, many alternative forms of facial orientation characteristic tracking setups could also be used. FIGS. 6A-6E illustrate examples of five facial orientation characteristic tracking systems that, among other possible systems, can be implemented according to embodiments of the present invention.

Figure 6A:
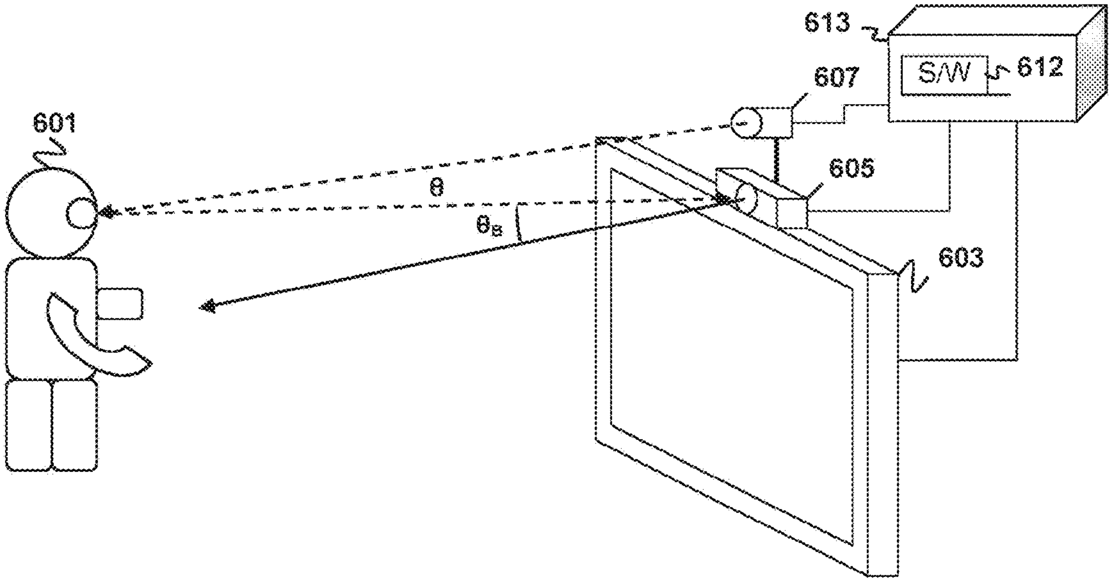
FIG. 6A-6E are schematic diagrams illustrating facial orientation characteristic tracking setups according to aspects of the present disclosure.

In FIG. 6A, the user 601 is facing a camera 605 and infrared light sensor 607, which are mounted on top of a visual display 603. To track the user's head tilt angle, the camera 605 may be configured to perform object segmentation (i.e., track user's separate body parts) and then estimate the user's head tilt angle from the information obtained. The camera 605 and infrared light sensor 607 are coupled to a processor 613 running software 612, which may be configured as described above. By way of example, and not by way of limitation, object segmentation may be accomplished using a motion model to describe how the image of a target might change in accordance to different possible movements of the object. It is noted that embodiments of the present invention may use more than one camera, for example, some implementations may use two cameras. One camera can provide a zoomed-out image of the field of view to locate the user, and a second camera can zoom-in and focus on the user's face to provide a close-up image for better head and gaze direction estimation.

A user's eye gaze direction may also be acquired using this setup. By way of example, and not by way of limitation, infrared light may be initially directed towards the user's eyes from the infrared light sensor 607 and the reflection captured by the camera 605. The information extracted from the reflected infrared light will allow a processor coupled to the camera 605 to determine an amount of eye rotation for the user. Video based eye trackers typically use the corneal reflection and the center of the pupil as features to track over time.

Thus, FIG. 6A illustrates a facial orientation characteristic tracking setup that is configured to track both the user's head tilt angle and eye gaze direction in accordance with an embodiment of the present invention. It is noted that, for the purposes of example, it has been assumed that the user is straight across from the display and camera. However, embodiments of the invention can be implemented even if the user is not straight across from the display 603 and/or camera 605. For example, the user 601 can be +45° or −45° to the right/left of display. As long as the user 601 is within a field of view of the camera 605, the head angle $\theta_H$ and eye gaze $\theta_E$ can be estimated. Then, a normalized angle can be computed as a function of the location of user 601 with respect to the display 603 and/or camera 605 (e.g. body angle $\theta_B$ as shown in FIG. 10A), the head angle $\theta_H$ and eye gaze $\theta_E$. By way of example and not by way of limitation, if the user 601, is located such that the body angle $\theta_B$ is +45° and if the head is turned at an angle $\theta_H$ of −45°, the user 601 is fixing the deviation of the body from the display 603 by turning his head, and this is almost as good as having the person looking straight at the display. Specifically, if, e.g., the user's gaze angle $\theta_E$ is zero (i.e., the user's pupils are centered), the normalized angle (e.g., $\theta_B+\theta_H+\theta_E$) is zero.

Figure 6B:
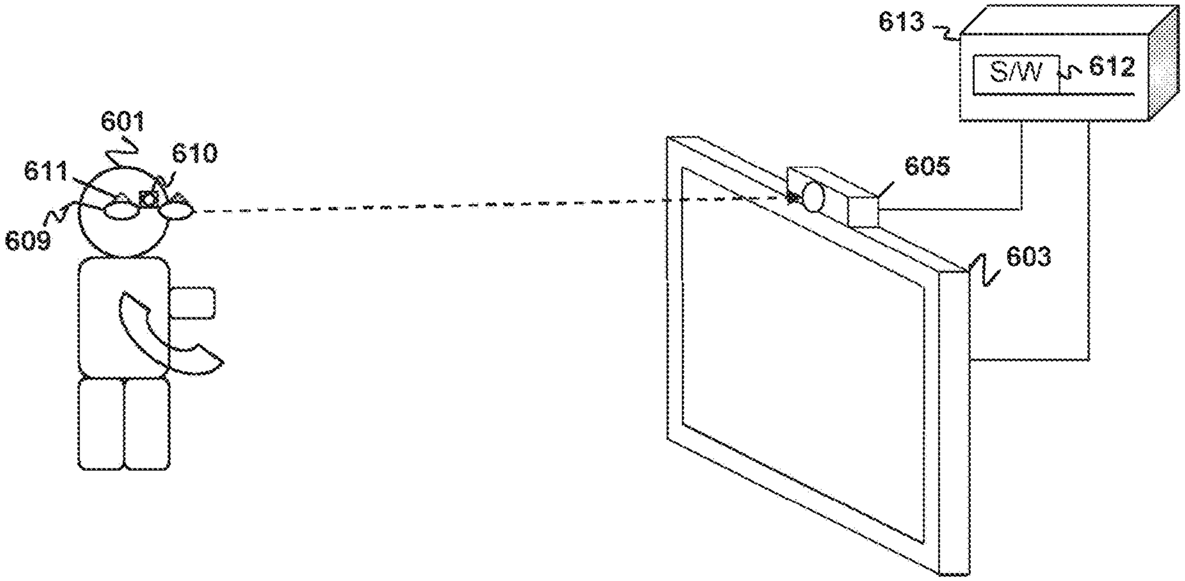

FIG. 6B provides another facial orientation characteristic tracking setup. In FIG. 6B, the user 601 is facing a camera 605 mounted on top of a visual display 603. The user 601 is simultaneously wearing a pair of glasses 609 (e.g., a pair of 3D shutter glasses) with a pair of spaced-apart infrared (IR) light sources 611 (e.g., one IR LED on each lens of the glasses 609). The camera 605 may be configured to capture the infrared light emanating from the light sources 611, and then triangulate user's head tilt angle from the information obtained. Because the position of the light sources 611 will not vary significantly with respect to its position on the user's face, this setup will provide a relatively accurate estimation of the user's head tilt angle.

The glasses 609 may additionally include a camera 610 which can provide images to the processor 613 that can be used in conjunction with the software 612 to find the location of the visual display 603 or to estimate the size of the visual display 603. By way of example, and not by way of limitation, the visual display be of a known type having known vertical and horizontal screen dimensions. A test image of a known size relative to the screen may be displayed. Images of the test image may be obtained by the camera and analyzed to determine the orientation and dimensions of the test image in the images obtained by the camera 610. Gathering this information allows the system to normalize the user's facial orientation characteristic data so that calculation of those characteristics is independent of both the absolute locations of the display 603 and the user 601. Moreover, the addition of the camera will allow the system to more accurately estimate visible range. Thus, FIG. 6B illustrates an alternative setup for determining a user's head tilt angle according to an aspect of the present disclosure. In some embodiments, separate cameras may be mounted to each lens of the glasses 609 facing toward the user's eyes to facilitate gaze tracking by obtaining images of the eyes showing the relative location of the pupil with respect to the centers or corners of the eyes, e.g., as discussed above. The relatively fixed position of the glasses 609 relative to the user's eyes facilitates tracking the user's eye gaze angle $\theta_E$ independent of tracking of the user's head orientation OH.

Figure 6C:
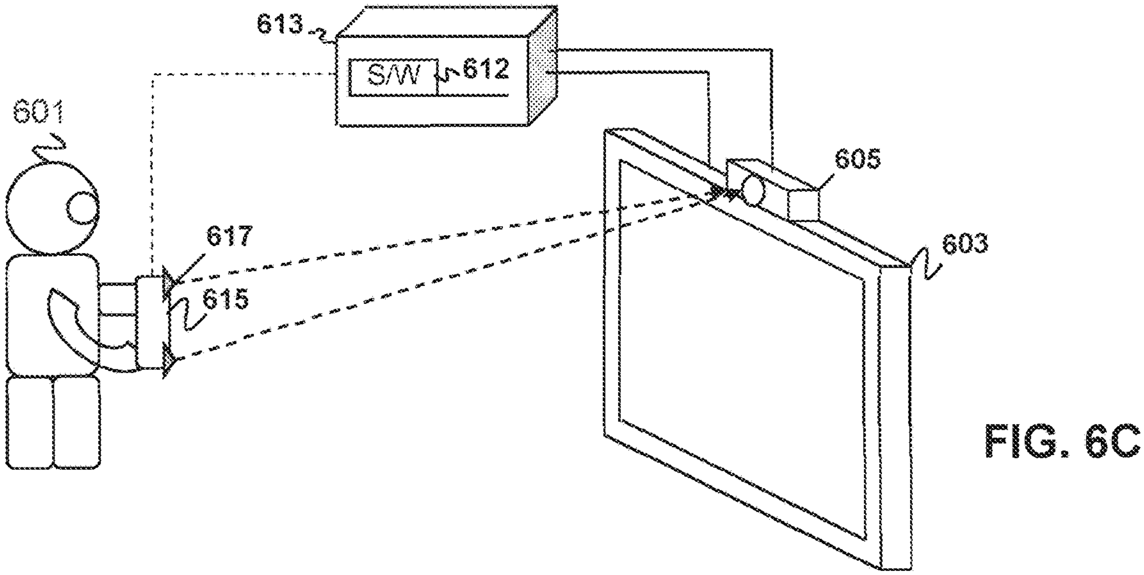

FIG. 6C provides a third facial orientation characteristic tracking setup. In FIG. 10C, the user 601 is facing a camera 605 mounted on top of a visual display 603. The user is also holding a controller 615 with one or more cameras 617 (e.g., one on each side) configured to facilitate interaction between the user 601 and the contents on the visual display 603.

Images from the camera 617 may be analyzed to determine the location of the visual display 603 or to estimate the size of the visual display 603, e.g., using a displayed test image as in the above example. Gathering this information allows the system to normalize the user's facial orientation characteristic data so that calculation of those characteristics is independent of both the absolute locations of the display 603 and the user 601. Moreover, the addition of the cameras 617 to the controller 615 allows the system to more accurately estimate visible range.

It is important to note that the setup in FIG. 6C may be further combined with the setup in FIG. 6A (not shown in FIG. 6C) in order to track the user's eye gaze direction in addition to tracking the user's head tilt angle while making the system independent of display size and location. Because the user's eyes are unobstructed in this setup, his eye gaze direction may be obtained through the infrared light reflection and capturing process discussed above.

Figure 6D:
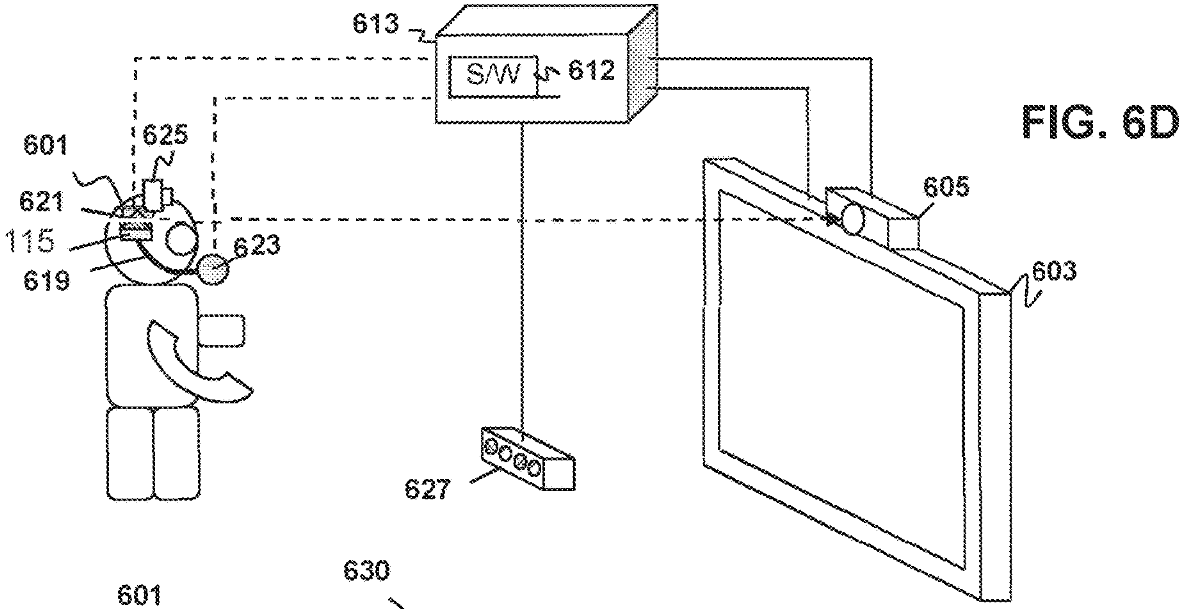

FIG. 6D provides yet another alternative facial orientation characteristic tracking setup. In FIG. 6D, the user 601 is facing a camera 605 mounted on top of a visual display 603. The user 601 is also wearing a headset 619 with infrared light sources 621 (e.g., one on each eyepiece) and a microphone 623, the headset 619 being configured to facilitate interaction between the user 601 and the contents on the visual display 603. Much like the setup in FIG. 6B, the camera 605 may capture images of the infrared light emanating from the light sources 621 on the headset 619, and the user's head tilt angle may be triangulated from analysis the images obtained. Because the position of the headset 619 tends not to vary significantly with respect to its position on the user's face, this setup can provide a relatively accurate estimation of the user's head tilt angle.

In addition to tracking the user's head tilt angle using the infrared light sensors 621, the position of the user's head with respect to a specified target may also be tracked by a separate microphone array 627 that is not part of the headset 619. The microphone array 627 may be configured to facilitate determination of a magnitude and orientation of the user's speech, e.g., using suitably configured software 612 running on the processor 613. Examples of such methods are described e.g., in commonly assigned U.S. Pat. No. 7,783,061, commonly assigned U.S. Pat. No. 7,809,145, and commonly-assigned U.S. Pat. No. 8,947,347, the entire contents of all three of which are incorporated herein by reference.

Using both the position of the microphone array 627 with respect to the camera 605 and the direction of the user's speech with respect to the microphone array 627, the position of the user's head with respect to a specified target (e.g., display) may be calculated. To achieve greater accuracy in establishing a user's head tilt angle, the infrared reflection and directional tracking methods for determining head tilt angle may be combined. Alternative embodiments may additionally include an inertial sensor 115, as described with respect to FIG. 1A above.

The headset 619 may additionally include a camera 625 configured to obtain images of the visual display 603 that may be analyzed to find the location of the display and/or to estimate the size of the visual display 603. Gathering this information allows the system to normalize the user's facial orientation characteristic data so that calculation of those characteristics is independent of both the absolute locations of the display 603 and the user 601. Moreover, the addition of the camera will allow the system to more accurately estimate visible range. In some embodiments, one or more cameras 625 may be mounted to the headset 619 facing toward the user's eyes to facilitate gaze tracking by obtaining images of the eyes showing the relative location of the pupil with respect to the centers or corners of the eyes, e.g., as discussed above. The relatively fixed position of the headset 619 (and therefore, the camera(s) 625) relative to the user's eyes facilitates tracking the user's eye gaze angle $\theta_E$ independent of tracking of the user's head orientation OH.

It is important to note that the setup in FIG. 6D may be combined with the setup in FIG. 6A (not shown in FIG. 6D) in order to track the user's eye gaze direction in addition to tracking the user's head tilt angle. Because the user's eyes are unobstructed in this setup, his eye gaze direction may be obtained through infrared light reflection and capturing process discussed above.

Figure 6E:
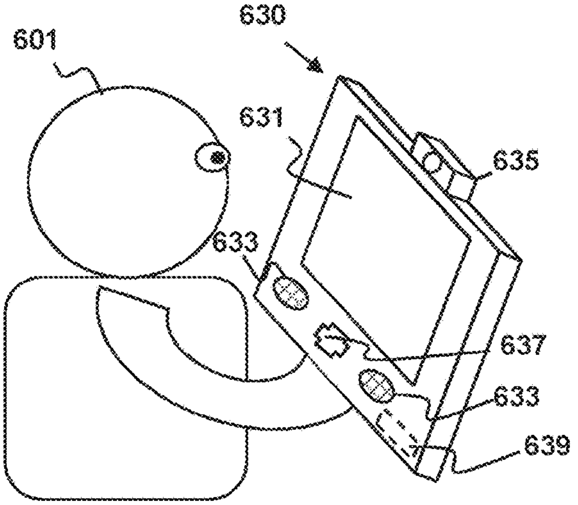

Embodiments of the present invention can also be implemented in hand-held devices, such as cell phones, tablet computers, personal digital assistants, portable internet devices, or portable game devices, among other examples. FIG. 6E illustrates one possible example of determining eye gaze direction in the context of a hand-held device 630. The device 630 generally includes a processor 639 which can be programmed with suitable software, e.g., as described above. The device 630 may include a display screen 631 and camera 635 coupled to the processor 639. One or more microphones 633 and control switches 637 may also be optionally coupled the processor 639. The microphone 633 may be part of a microphone array. The control switches 637 can be of any type normally used with the particular type of hand-held device. For example, if the device 630 is a cell phone, the control switches 637 may include a numeric keypad or alpha-numeric keypad, touch screen, or touch pad, as commonly used in such devices. Alternatively, if the device 630 is a portable game unit, the control switches 637 may include digital or analog joysticks, digital control switches, triggers, and the like. In some embodiments, the display screen 631 may be a touch screen interface and the functions of the control switches 637 may be implemented by the touch screen in conjunction with suitable software, hardware or firmware. The camera 635 may be configured to face the user 601 when the user looks at the display screen 631. The camera 635 may also include one or more light sources (e.g. infrared lights) configured to shine into the eyes of the user 601 to generate reflections for eye gaze tracking. The processor 639 may be programmed with software to implement head pose tracking and/or eye-gaze tracking. The processor may be further configured to utilize head pose tracking and/or eye-gaze tracking information, e.g., as discussed above.

It is noted that the display screen 631, microphone(s) 633, camera 635, control switches 637 and processor 639 may be mounted to a case that can be easily held in a user's hand or hands. In some embodiments, the device 630 may operate in conjunction with a pair of specialized glasses, which may have features in common with the glasses 609 shown in FIG. 6B and described hereinabove. Such glasses may communicate with the processor through a wireless or wired connection, e.g., a personal area network connection, such as a Bluetooth network connection. In some embodiments, the device 630 may be used in conjunction with a headset, which can have features in common with the headset 619 shown in FIG. 6D and described hereinabove. Such a headset may communicate with the processor through a wireless or wired connection, e.g., a personal area network connection, such as a Bluetooth network connection. The device 630 may include suitable antenna and transceiver to facilitate wireless network connection.

It is noted that the examples depicted in FIGS. 6A-6E are only a few examples of many setups that could be used to track a user's facial orientation characteristics in accordance with aspects of the present disclosure. Similarly, various body and other facial orientation characteristics in addition to the head tilt angle and eye gaze direction described above may be tracked to facilitate the initiation of commands based gaze patterns.

As described herein, gaze tracking may be used to enhance the user experience by providing a reading control mode. The reading control mode allows the user to command the program intuitively by looking at portions of the screen and may be configured to provide additional accessibility tools for reading small text and seeing fine grain detail in images. As such using devices that provide three-dimensional control environments, operation of programs and use of images with fine text may be more intuitive and easier for user when using the reading program with gaze tracking according to aspects of the present disclosure.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method of controlling a computer program, comprising:

presenting one or more images on a display device in response to execution of the computer program on a computing device;

collecting gaze tracking information corresponding to a location of a user's gaze with respect to the one or more images presented on the display device;

analyzing the gaze tracking information to detect a pattern of the user's gaze characteristic of reading; and upon detecting the pattern of the user's gaze characteristic of reading, activating a first mode in which the user's gaze triggers commands affecting execution of the computer program.

2. The method of claim 1, further comprising deactivating the first mode upon detecting a second pattern of the user's gaze inconsistent with reading.

3. The method of claim 1, wherein the pattern of the user's gaze characteristic of reading is characterized by one or more periods of time in which the user's gaze dwells on a portion of the one or more images for a predetermined period of time.

4. The method of claim 1, wherein the pattern of the user's gaze characteristic of reading is characterized by one or more periods of time in which the user's gaze dwells on a portion of the one or more images that the user's gaze has previously dwelt on for a predetermined period of time.

5. The method of claim 1, wherein the pattern of the user's gaze characteristic of reading is characterized by one or more periods of time in which the user's gaze dwells on a portion of the one or more images containing text for a predetermined period of time.

6. The method of claim 1, wherein collecting the gaze tracking information includes determining an orientation of the user's head and an orientation of one or more of the user's eyes.

7. The method of claim 1, wherein the display device is part of a head mounted display (HMD) device.

8. A system for controlling a computer program, comprising:

one or more storage media storing instructions; and one or more processors configured to execute the instructions to cause the system to:

present one or more images on a display device in response to execution of the computer program on a computing device;

collect gaze tracking information corresponding to a location of a user's gaze with respect to the one or more images presented on the display device;

analyze the gaze tracking information to detect a pattern of the user's gaze characteristic of reading; and upon detecting the pattern of the user's gaze characteristic of reading, activate a first mode in which the user's gaze triggers commands affecting execution of the computer program.

9. The system of claim 8, wherein detecting the pattern comprises detecting a gaze movement pattern.

10. The system of claim 9, wherein the display device is part of a head-mounted display (HMD) device.

11. The system of claim 8, further comprising a gaze tracking system configured to track the user's gaze and generate the gaze tracking information over time corresponding to the location of the user's gaze with respect to the one or more images presented on the display device.

12. The system of claim 11, wherein the gaze tracking system is a dark pupil gaze tracking system.

13. The system of claim 11, wherein the gaze tracking system is a bright pupil gaze tracking system.

14. The system of claim 11, wherein the gaze tracking system is configured to generate information corresponding to an orientation of the user's head and an orientation of one or more of the user's eyes.

15. The system of claim 11, wherein the display device and the gaze tracking system are part of a head-mounted display (HMD) device.

16. A method of controlling a computer program, comprising:

presenting one or more images on a display device in response to execution of the computer program on a computing device;

collecting gaze tracking information corresponding to a location of a user's gaze with respect to the one or more images presented on the display device;

analyzing the gaze tracking information to detect a pattern of the user's gaze inconsistent with reading; and upon detecting the pattern of the user's gaze inconsistent with reading, activating a first mode in which the user's gaze triggers commands affecting execution of the computer program.

17. The method of claim 16, further comprising deactivating the first mode upon detecting a second pattern of the user's gaze consistent with reading.

18. The method of claim 16, wherein analyzing the gaze tracking information comprises analyzing gaze transition entropy.

19. The method of claim 16, wherein the pattern of the user's gaze inconsistent with reading is characterized by one or more periods of time in which the user's gaze dwells on a portion of the one or more images.

20. The method of claim 16, wherein the pattern of the user's gaze inconsistent with reading is characterized by one or more periods of time in which the user's gaze dwells on a portion of the one or more images absent of text for a predetermined period of time.

* * * * *